United States Patent [19]

Gallone

[11] Patent Number: 4,623,201
[45] Date of Patent: Nov. 18, 1986

[54] SLIDING UNIT FOR TOOL MACHINES

[75] Inventor: Fiorenzo Gallone, Milan, Italy

[73] Assignee: Mondial S.p.A., Milan, Italy

[21] Appl. No.: 701,302

[22] Filed: Feb. 13, 1985

[30] Foreign Application Priority Data

Feb. 13, 1984 [IT] Italy .............................. 20836/84[U]

[51] Int. Cl.⁴ ............................................ F16C 29/04
[52] U.S. Cl. ....................................... 384/53; 384/55
[58] Field of Search ................ 308/6 R, 6 C, 3.8, 241, 308/DIG. 8; 384/909, 907

[56] References Cited

U.S. PATENT DOCUMENTS

| 4,194,793 | 3/1980 | Offermans | 308/3.8 |
| 4,304,443 | 12/1981 | Hoffmann | 308/6 R |
| 4,406,502 | 9/1983 | Teramachi | 308/6 R |
| 4,457,567 | 7/1984 | Kraan | 308/6 R |
| 4,502,737 | 3/1985 | Osawa | 308/6 C |

Primary Examiner—Lenard A. Footland
Attorney, Agent, or Firm—Oblon, Fisher, Spivak, McClelland & Maier

[57] ABSTRACT

In a sliding unit for machine tools and/or portions of them, essentially comprising guides and supports, the ones being sliding relatively to the others and vice-versa, the guides are extruded hollow section bars with octagonal cross section, made of light alloy, and the supports bear rolling means, which cooperate with opposed surfaces of said guides.

16 Claims, 5 Drawing Figures

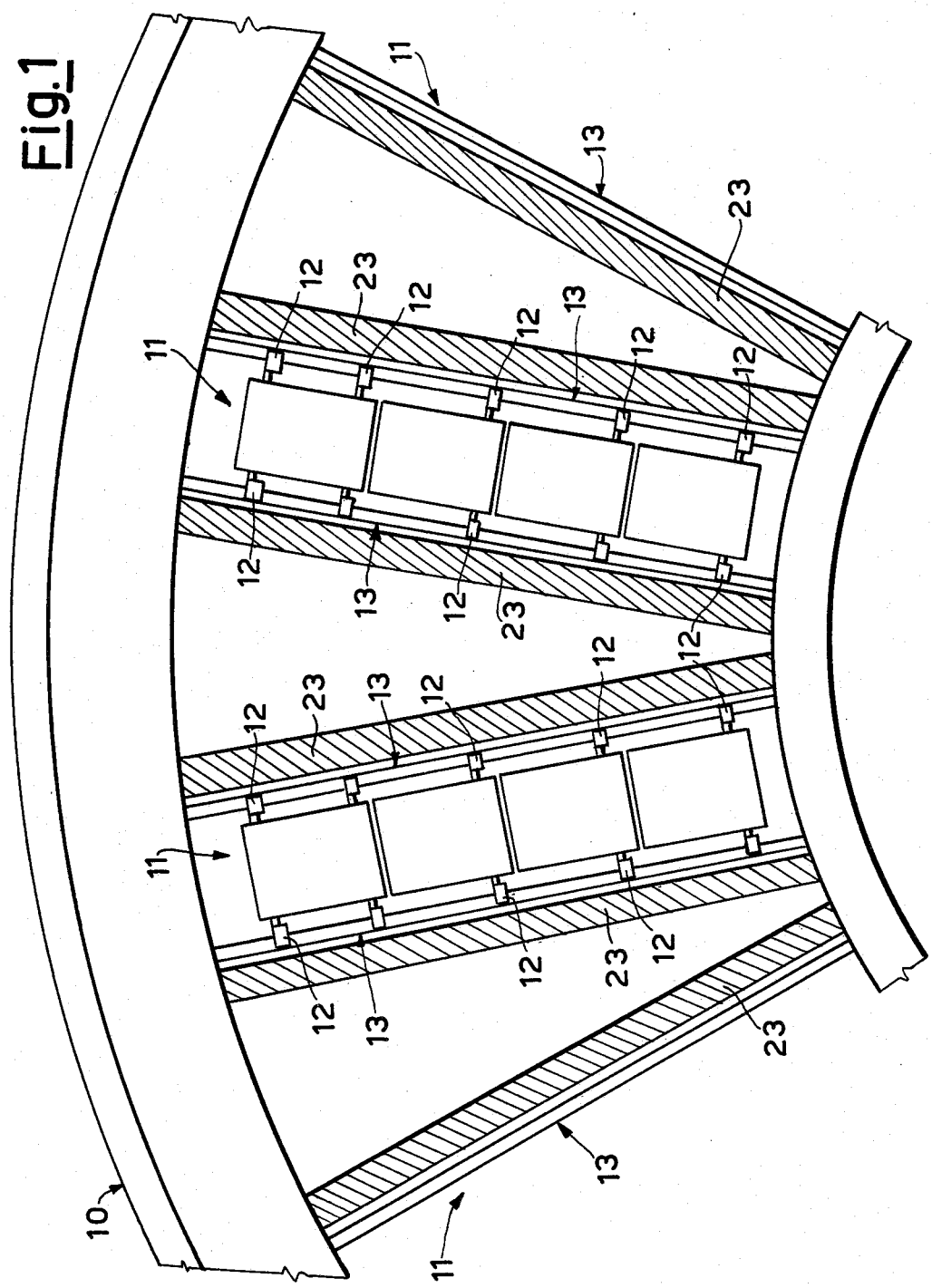

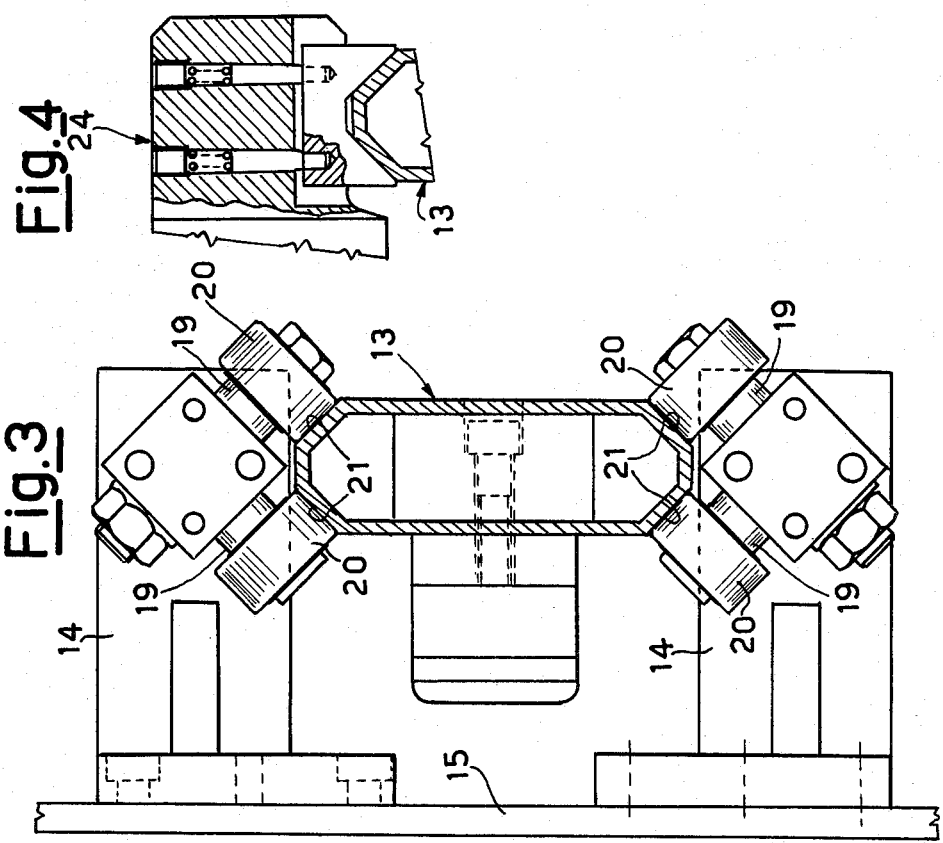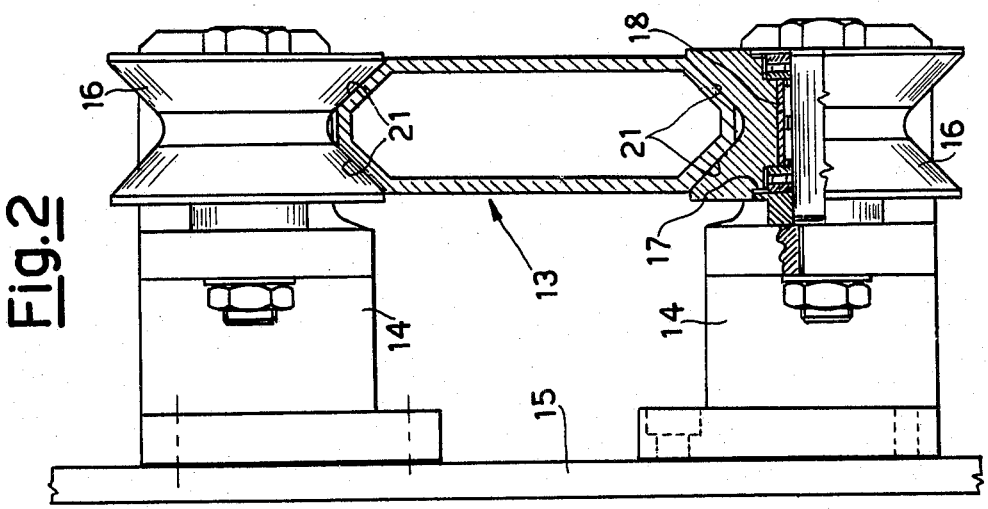

SLIDING UNIT FOR TOOL MACHINES

FIELD OF THE INVENTION

The present invention relates to a sliding unit for machine tools or for portions thereof. The sliding unit essentially comprises supports and guides, the supports being fixed and the guides being sliding or vice-versa. The sliding unit is very strong, particularly light, and capable of withstanding high loads imposed on it in different directions of application.

BACKGROUND OF THE INVENTION

Sliding units are known, essentially consisting of shaped guides or slides of casehardened and hardened alloy steel. The treatments of such sliding units is carried out in a particularly careful way, in order to preserve a high degree of straightness, independently from the length and the section thereof.

Such slides or guides slide or are slidable on suitable supporting devices comprising bearings, mounted on supporting plates, coupled to each other, so as to define complementary seats suitable to accomodate such slides.

In view of such a purpose, the surface of the outer ring of said bearings is beveled on at least one side, and defines, together with an opposite surface of the coupled bearing, said sliding seat. Shaped guides so made are however very heavy, and they require a high treatment and processing precision. They are manufactured in the form of short bars, positioned close to each other, so as to define sliding ways having a determined length.

The so-made supports and related bearings do not allow a high coupling precision and such a strength to be achieved, as to guarantee the desired sliding safety.

OBJECTS OF THE INVENTION

The principal object of the present invention is to provide a sliding unit that is very light, very strong, and very simple as far as the structure and the functional and adjustment characteristics thereof are concerned.

A further object of the invention is to make it possible to provide an easy, speedy and safe connection between said section bars and the several auxiliary elements of the sliding unit.

SUMMARY OF THE INVENTION

These and further purposes, according to the novel concepts of the present invention, are achieved by providing a sliding unit for machine tools and/or portions thereof, essentially comprising guides and supports, the ones being sliding relatively to the others, and/or vice-versa, characterized in that said guides are extruded hollow section bars with octagonal cross section, and made of light alloy, and that said supports bear rolling means cooperating with opposed surfaces of said guides.

BRIEF DESCRIPTION OF THE DRAWINGS

Characteristics and peculiarities of a sliding unit according to the present invention will be better understood from the following exemplifying and not limitative disclosure, referred to the enclosed schematic drawings, wherein:

FIG. 1 is a plan view of a portion of a welding line with to-and-fro sliding units;

FIG. 2 is a detail of a sliding unit, in partly sectional view;

FIG. 3 is another example of a sliding unit according to the present invention;

FIG. 4 shows a section of a scraper pad that is a part of the sliding unit of FIG. 1.

DETAILED DESCRIPTION OF THE PRESENTLY PREFERRED EMBODIMENTS

Figure 5:
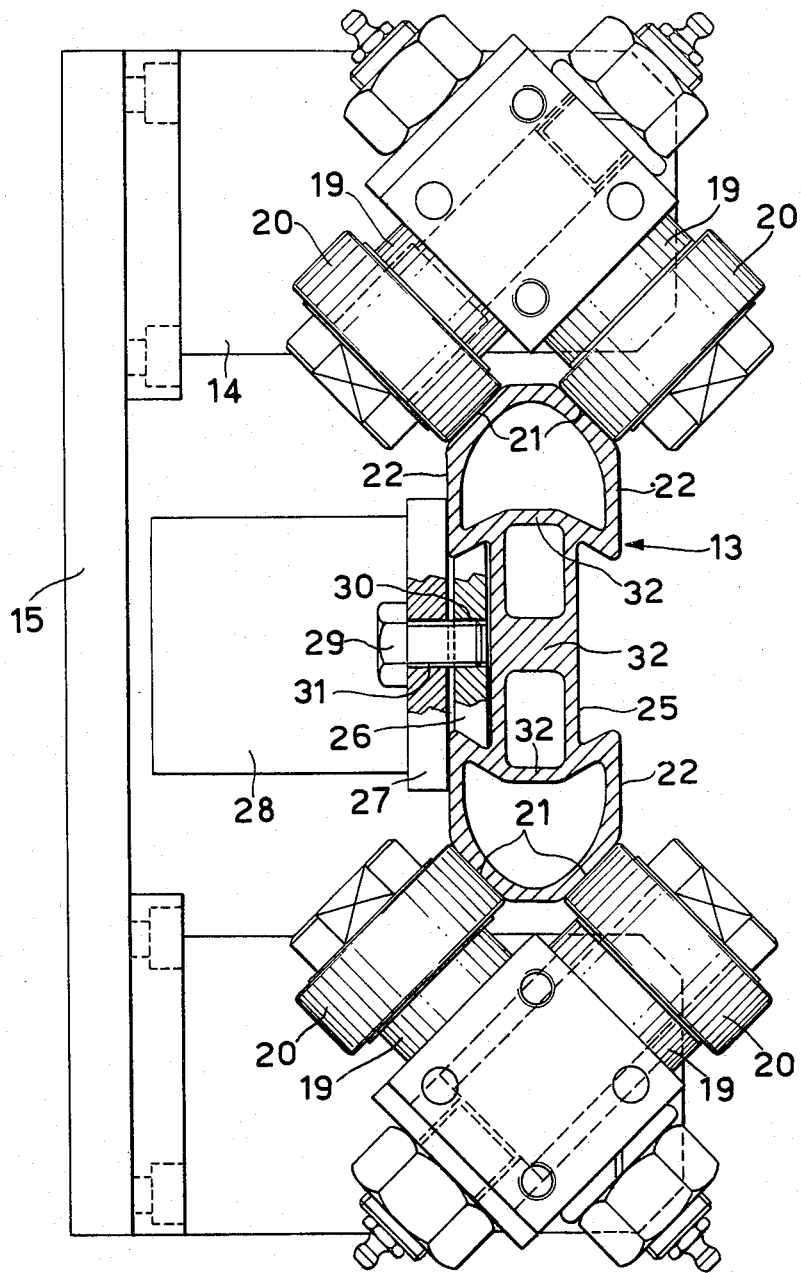
FIG. 5 is a detail of a sliding unit, shown in partly sectional view, with improved connections.

Referring to the drawings, in an automated welding line, e.g. for car bodies, indicated with 10 and partly and schematically shown, comprises a series of movable sectors 11 for feeding single components or subassemblies to be positioned and fastened, thus realizing the body, which is being moved tangentially to the single sectors 11 or stations, and progressively formed.

The sectors 11 are positioned on supports 12 sliding on opposite sides on guides 13 which provide sliding units according to the present invention.

More precisely, and as shown in FIG. 12, the supports 12 can comprise brackets 14, constrained to a base 15 and bearing rolling means, such as, e.g., "V"-rollers 16 positioned on axial bearings 17 and radial bearings 18 (FIG. 2), or more simply pairs of shafts 19 perpendicular to each other, and bearing cylindrical rollers 20 (FIG. 3).

Both the V-rollers 16 and the cylindrical rollers 20 are positioned on opposite sides of the guides 13 and slide on surfaces 21 of the guide 13 itself. In the illustrated embodiment, the guide 13 is a hollow bar that has an octagonal cross-section. The bar is made of a cold-extruded or hot-extruded aluminum alloy. As shown in FIG. 1, the guide 13 is mounted on a frame 23 of the welding line 10. More precisely, the characteristics of the guide 13 according to the invention may be summarized in the particular shape of the section bar obtained. That bar is provided with surfaces 21 inclined relatively to each other by 90°, provides an outline which is mechanically very efficient, and which is capable of absorbing loads applied from the moist different directions.

More precisely, in FIG. 5 a guide 13 is provided, according to the invention, having on its side surfaces 22 longitudinal shaped grooves 25, e.g., of the so-called dovetail type, positioned on one side or on both sides, suitable to slidingly contain a plate element 26 of complementary shape.

The plate element 26, which can be inserted inside the shaped groove 25 with a small clearance, can support by means of a mating plate 27, acting on the side surfaces 22, a complementary element, schematically shown at 28, thanks to the cooperation of, e.g., a screw 29. The screw 29 is positioned inside a threaded bore 30 of the plate element 26 and a corresponding bore 31 of the mating plate 27.

The complementary element 28 may be e.g. arm, a let, a control rack, and so on. Such complementary elements are thus positioned solidly with the guide 13, it being not necessary to resort to drillings or other processings thereof, which would be difficult and binding, in that they should be carried out preliminarily.

Advantageously, inside the guide 13 reinforcing ribs 32 may be provided. The ribs 32 confer a higher strength to the loads applied from most different directions.

It can be immediately understood how the fastening of the mating plate 27, constituting the supporting base of a complementary element 28, to the guide 13, takes place.

The plate element 26, fastened by means of the screw 29 to the mating plate 27, is inserted inside the shaped groove 25 of the guide 13.

The tightening of the screw or screws 29 causes the engagement of the plate element 26 inside the shaped groove 25 thanks to the counter-positioning and the consequent reaction of the mating plate 27 on the side surfaces 22 of the guide 13.

The greater lengths of the plate element 26 and of the mating plate 27 cause a higher strength also to loads tangential to the direction of the guide 13.

The presence of the reinforcing rib 32 allows also the plate-element 26 and the mating plate 27 to be connected by drilling the guide 13, in that precisely in the central zone of the guide 13 a high enough resistance exists to the loads transmitted by the screws 29 and by the jointing pins.

The butt jointing of the lengths of the guide 13 in order to achieve the desired length of the sliding way can be effected by adhesion, by using the groove-complementary plate joint system and positioning the plates and related mating plates astride of the lengths of the guide 13 to be jointed, or in an equivalent way, by placing through-screws passing through the conjunction plates and the bars with both systems associated.

Of particular advantage is the possibility of fastening to the guide 13 the complementary elements 28 without carrying out any drilling--i.e., by using the shaped groove 25. In this way indeed a great assembling fastness of the line, of the supports, and of the guides is achieved.

Any possible risks of errors in positioning are eliminated, in that the correct positioning is defined only in the assembling stage, and can be modified as desired and as the arising needs.

This positioning fastness allows consequently a great flexibility and possibility of change and replacement of the complementary element 28, according to the needs of the line or of the plant.

In particular, it is possible to obtain by extrusion the guides 13 of the desired length, with such dimensional tolerances as for the shape and geometrical errors, as to allow said bars to be used without subsequent finishing machining.

The good mechanical characteristics of the aluminum alloys allow large stress loads to be applied with no danger of breakage or of permanent deformation.

When the section bars are used as sliding element between fixed supports, the low weight is particularly valuable of the same bar, which reduces the costs related to the use of motors and of braking plants in that, thanks to the small mass, no high driving or braking torques are needed for the starting and the stopping.

A further characteristic is that the surface of the section bar is submitted to a hard anodizing treatment, improving the characteristics of surface hardness of the hardened and tempered aluminum alloy up to a value of 800 Vickers hardness, as a function of the alloy used and of the thickness of oxidized layer.

By means of such hardness values, it is possible to have the high specific pressure due to the linear contact between the rolling elements of the supports and the bar, withstood by the hardened and tempered aluminum alloy. Wear resistance and abrasion resistance are guaranteed by the use of such galvanic treatment.

In addition to the characteristics of producing an extremely hard surface, the hard anodizing treatment offers further advantages:

The galvanic treatment does not induce deformations on treated components. Thus increases of the twists, of the deflections, and of planarity defects are not experienced.

The oxide coat is particularly heat resistant and therefore possible local overheatings do not induce appreciable alterations in device functionality.

The coat of oxide has a high resistance to corrosive agents. It is therefore possible to use these devices in environments wherein a high concentration of corrosive agents may be found.

The hard oxide coat is a very good electric insulating material, so no additional protection is required, except in the presence of very strong currents.

The oxidized surface is of uniform dark colour and shows a very good surface finishing, so it does not require any further finishing treatments.

The oxidized surface shows noticeable antiadhesive properties. Spills of welding material and splashes of other agents with characteristics of particular adhesion to metal surfaces are rejected by the anodized surface. A scraper device 24 (FIG. 4) is enough for removing possible deposits of this kind from the guide 13.

The supports 12 may be formed by many combinations of rolling means, depending on the specific type of use, and with notable saving of single rolling components, the brackets 14 may, e.g., bear:

Two combined radial-axial bearings mounted opposed to each other, with a V-shaped outer roller rotatably supported on them. Such a structure is suitable for low loads and high speeds.

Four radial bearings opposed two by two, rotating on the faces inclined by 45° of the section, particularly suitable, when so positioned, for medium loads and high speeds.

Eight, or multiples of four radial bearings opposed two by two, rotating on the faces inclined by 45° of the section, used for heavy loads and high speeds.

Four, or multiples of four linear roller bearings (roller blocks), opposed two by two on the sides inclined by 45° C. of the section, for heavy loads and limited speeds and accelerations.

Should particular problems arise due to the noise caused by the metallic contact between the supports and the guide bar, the filling of the cavity of the section bar can be provided, by injecting, inside the hollow section of the bar, expanded polyurethane, or another similar material, capable of damping the vibrations of the sliding unit. A further possibility of damping of sound vibrations consists in the coating with plastic material of the outer ring of the bearing constituting some examples previously described.

A sliding unit according to the invention is the ideal solution for all those conveyance or sliding systems for which the requirements of lightness of the running ways and of low friction of the supports are regarded as absolutely necessary, and for those situations wherein low available powers do not allow heavier sliding units to achieve significant performance gains. The elective use is represented, as already mentioned, by the use of the system in the lines with to-and-fro movement for the progress of the assemblies constituting the car bodies on automated and robot-slaved welding lines.

I claim:

1. A sliding unit for machine tools, said sliding unit comprising:
   (a) a frame;
   (b) at least one hollow guide mounted on said frame, said at least one hollow guide having four guide surfaces, a first guide surface, a second guide surface adjacent to said first guide surface and at least approximately perpendicular thereto, a third guide surface adjacent to said second guide surface and at least approximately parallel to said first guide surface, and a fourth guide surface adjacent to said third guide surface and said first guide surface and at least approximately perpendicular to said third guide surface;
   (c) at least two supports, each of said at least two supports having at least two rolling surfaces, each of said rolling surfaces rolling on a corresponding one of said four guide surfaces on said at least one hollow guide; and
   (d) a machine tool element mounted on said at least two supports.

2. A sliding unit as recited in claim 1 wherein said rolling surfaces on said at least two supports are cylindrical rollers.

3. A sliding unit as recited in claim 1 wherein said rolling surfaces on said at least two supports are V-rollers, each of which has two of said rolling surfaces.

4. A sliding unit as recited in claim 1 wherein said at least one hollow guide is an extruded bar.

5. A sliding unit as recited in claim 1 wherein said at least one hollow guide is made of a light alloy.

6. A sliding unit as recited in claim 1 wherein said four guide surfaces have been subjected to anodic oxidation.

7. A sliding unit as recited in claim 1 and further comprising a sound-deadening and vibration-dampening material disposed inside said at least one hollow guide.

8. A sliding unit as recited in claim 1 wherein each of said at least two supports comprises:
   (a) a bracket and
   (b) two shafts, each one of said two shafts mounting one of said two rolling surfaces, said two shafts being at least approximately perpendicular to one another.

9. A sliding unit as recited in claim 1 and further comprising at least one scraper pad mounted on each of said at least two supports and sized, shaped, and positioned to clean said four guide surfaces as said at least one hollow guide and said at least two supports move relative to each other.

10. A sliding unit as recited in claim 1 and further comprising a coat of plastic material on each of said four guide surfaces.

11. A sliding unit as recited in claim 1 wherein said at least one hollow guide contains at least one internal longitudinal reinforcing rib.

12. A sliding unit as recited in claim 1 wherein:
   (a) said at least one hollow guide has:
      (i) at least one longitudinal surface located between two of said four guide surfaces and
      (ii) a longitudinal shaped groove in said at least one longitudinal surface and
   (b) said machine tool element is mounted on a coupling element slidingly disposed in said longitudinal shaped groove.

13. A sliding unit as recited in claim 12 wherein said at least one hollow guide has:
   (a) a first longitudinal surface located between said second guide surface and said third guide surface and a second longitudinal surface located between said fourth guide surface and said first guide surface and
   (b) a first longitudinal shaped groove in said first longitudinal surface and a second longitudinal shaped groove in said second longitudinal surface.

14. A sliding unit as recited in claim 12 wherein said longitudinal shaped groove is dove-tail shaped.

15. A sliding unit as recited in claim 12 wherein said coupling element comprises:
   (a) a plate element slidably received in said longitudinal shaped groove;
   (b) a mating plate slidably abutting said at least one longitudinal surface; and
   (c) means for releasably mounting said mating plate on said plate element.

16. A sliding unit as recited in claim 15 wherein said means for releasably mounting said mating plate on said plate element comprises a bolt.

* * * * *